Nov. 19, 1946.  A. J. GRANBERG  2,411,261
FLUID METERING APPARATUS
Filed June 17, 1942  2 Sheets-Sheet 1
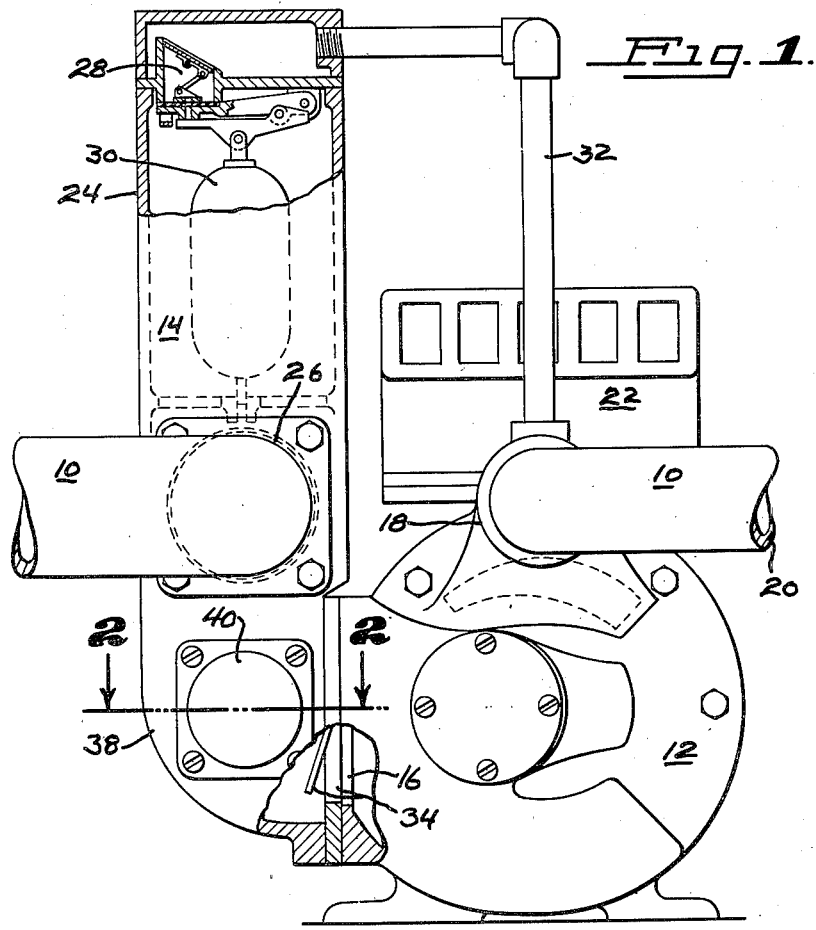
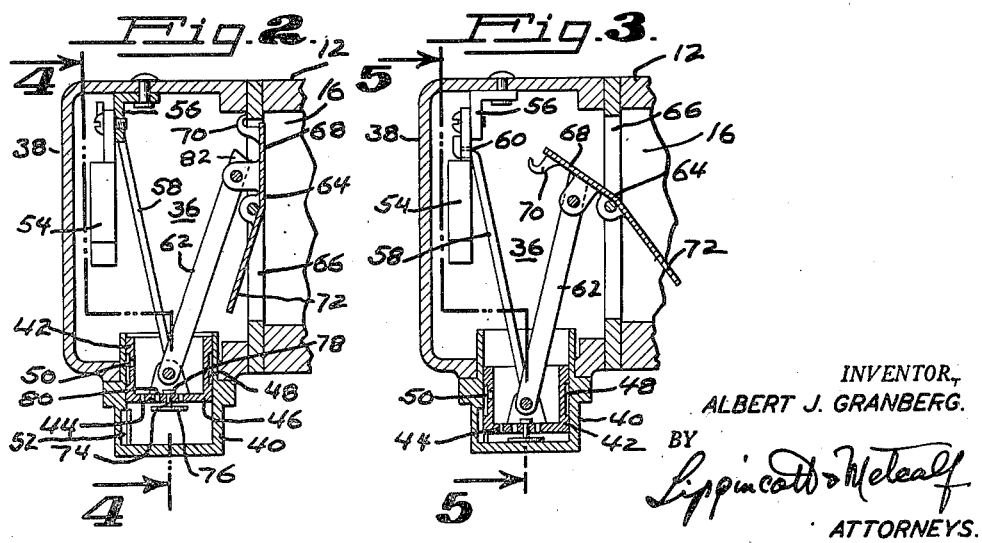
INVENTOR,
ALBERT J. GRANBERG.
BY
Lippincott & Metcalf
ATTORNEYS.

Nov. 19, 1946.  A. J. GRANBERG  2,411,261
FLUID METERING APPARATUS
Filed June 17, 1942  2 Sheets-Sheet 2
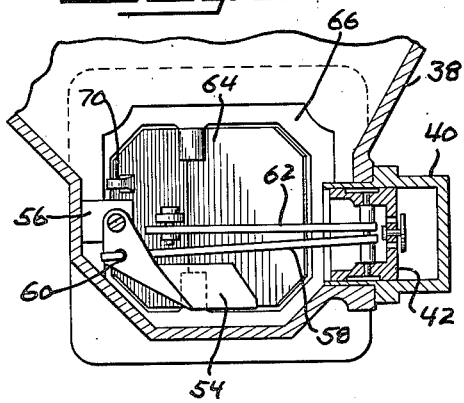
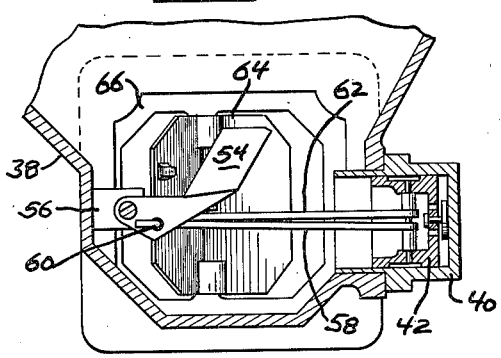
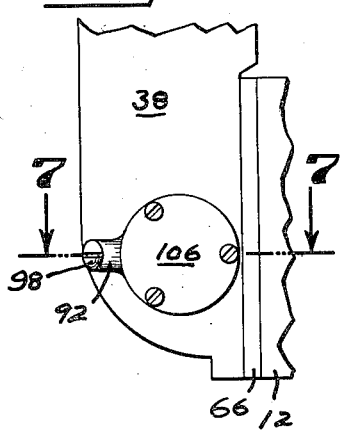
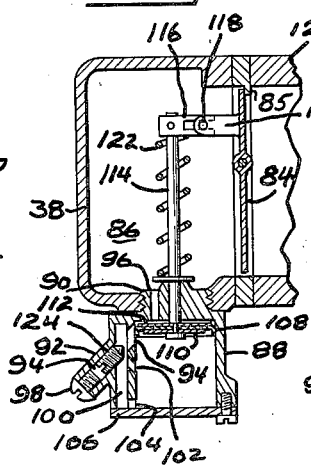
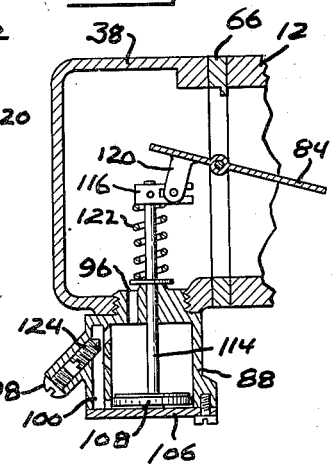
INVENTOR,
ALBERT J. GRANBERG.
BY
ATTORNEYS.

Patented Nov. 19, 1946

2,411,261

UNITED STATES PATENT OFFICE 2,411,261

FLUID METERING APPARATUS

Albert J. Granberg, Oakland, Calif.

Application June 17, 1942, Serial No. 447,421

5 Claims. (Cl. 73—200)

My invention relates to metering apparatus for measuring liquids under flow conditions, and, for purposes of illustration, will be described in connection with its application to the dispensing of gasoline, oil and the like from trucks to the storage tanks of service stations, though it is to be understood that the field of utility of my invention is not restricted to such limited application.

In the distribution of gasoline, oil, etc., the same is discharged from tank trucks as when supplying the underground storage tanks of a service station for subsequent resale to customers. The trucks are provided with fluid meters through which the liquid is caused to flow and be measured before entering the discharge hose, suitable means usually being associated with the meter to remove air from the liquid prior to its reaching the meter, so as to avoid false readings during a metering period. It has been found, however, that errors in the meter recordings are often introduced at the very start of a dispensing period, the cause being traced to the fact that at the moment a discharge from the truck tank is started, the initial flow carries with it, through the meter, a substantial amount of air which, due to leaks or other causes, may have accumulated in the line since the previous discharge, and this is particularly apt to be the case upon the first discharge following the filling of an empty truck tank.

Among the objects of my invention are:

(1) To provide novel and improved apparatus for the removal of air from the initial flow of fluid to the meter;

(2) To provide novel and improved means for precluding false readings in a fluid recording meter, normally attributable to the accumulation of air in the line, which air passes to the meter with the initial flow of liquid thereto;

(3) To provide novel and improved apparatus to carry out the foregoing objects, which apparatus shall be compact and efficient in operation.

Additional objects of my invention will be brought out in the following description of the same taken in conjunction with the accompanying drawings wherein—

Figure 1 is an elevational view of the combination comprising my invention, the combination being made novel by the cooperative inclusion of a special flow delay valve assembly in a prior known meter arrangement;

Figure 2 is a view in section on line 2—2 of Figure 1, showing one embodiment of such flow delay valve assembly with the valve in its normal rest position;

Figure 3 is a similar view showing the same valve assembly in fully open position;

Figure 4 is a view in section taken on the line 4—4 of Figure 2;

Figure 5 is a view in section taken on the line 5—5 of Figure 3;

Figure 6 is a fragmentary elevational view of the apparatus of Figure 1, showing a modified flow delay valve assembly;

Figure 7 is a view in section of the modified flow delay valve assembly, taken on the line 7—7 of Figure 6, and showing the valve in its normally closed position; and Figure 8 is a similar view showing the valve in its fully open position.

In general, the objects of my invention are realized by interposing in the fluid path to the meter and preferably between the meter and the air separator, a flow delay valve or equivalent structure, whose function it is to impede the full flow of fluid to the meter during the initial portion of a metering period and for a time sufficient to permit the air separator to remove accumulated air therefrom. Following this, the line is completely opened to permit continuous full capacity flow through the meter as long as desired, the air separator being capable of removing the air normally present during such full capacity flow.

Referring to the drawings for a more detailed description, I have illustrated in Figure 1 a portion of the line 10 including the meter 12 and the air separator 14. The meter, in so far as the combination comprising the invention is concerned, need not be limited to any specific type but may be any meter capable of measuring liquid flowing therethrough. The particular meter which I have shown for purposes of illustration is of the rotatable vane type disclosed in the patent for Fluid meter, No. 2,272,170, of February 10, 1942, in which I am joint inventor, and, as such, includes an inlet 16 to the interior compartments formed by the rotatable vanes (not shown), a discharge 18 connecting to a hose 20 and a recorder 22 supported on the meter and operated usually from the meter shaft.

The air separator may be of any suitable type, but, for purposes of illustration, I have selected an air separator of the type also disclosed in the aforementioned patent, although the same has been modified to adapt it to the combination of the present case. Briefly, it comprises a housing 24, in the lower portion of which lies a cylindrical filter 26 extending from the inlet opening to the housing, and in the upper portion of the housing is an air release valve 28 controlled by a float 30.

Fluid to be discharged through the meter is first introduced into the lower section through the filter, to rise into the upper section where any air in the fluid has an opportunity to separate out therefrom. The float 30, during high liquid level conditions, serves to hold the air release valve 28 closed until the accumulation of air in the upper section of the housing lowers the liquid level and drops the float sufficiently to pull the valve open and permit escape of the air. Air, thus released, is conducted through an air tube 32 back into the main line at the discharge side of the meter, and in this manner is by-passed around the meter and is not conducted through it to give false readings.

Ordinarily, the air separator 14 is connected to feed directly into the meter 12 and it is so disposed with respect thereto as to leave the meter fully primed between discharges. In the improved apparatus of my present invention, a flow delay valve 34 is interposed between the air separator and the meter, and preferably disposed below the filter and in communication therewith and the input to the meter, so that all the liquid must pass through this valve on its way to the meter.

The valve 34 is operated through control mechanism 36 which is housed in a casing 38 which may, if desired, constitute an integral portion of the air separator housing 24. This casing includes a cylinder 40 extending outwardly from a side wall thereof, the cylinder preferably constituting an independent element securely fastened in an opening in the wall of the casing and communicating with the interior of the casing. A piston 42 reciprocally mounted in this cylinder, is provided with a relief perforation 44 through the head 46 thereof, and, further, has its outer cylindrical wall peripherally grooved, the groove 48 thus formed being made to communicate with the interior of the casing by a hole 50 through the reduced portion of the cylindrical wall. A longitudinal slot or groove 52 in the interior wall of the cylinder adjacent its outer end, provides open communication between the work side of the piston and the interior of the casing after the piston has traveled but a portion of its full stroke.

Forward movement of the piston in the cylinder is normally retarded by a counterweight 54 pivotally secured to a bracket 56 mounted on an inner wall of the casing and connected to the piston 42 by a link 58 having one end secured through a hole 60 in the weight, and its other end pivotally secured to the piston 42.

Also pivotally secured to the piston is another link 62. This link is pivotally secured adjacent its other end, to the valve 34 which in this instance takes the form of an eccentrically mounted swingable gate 64 freely supported across the input 16 to the meter within a frame 66 which is clamped between the output of the casing 38 and the input 16 to the meter. The pivotal connection of the link 62 is to the smaller section 68 of the gate. A stop 70 at the edge of the smaller section overhanging the same is adapted to abut against the inner edge of the valve supporting frame 66 to fix the normal rest position of the valve, which condition exists with the piston in its retracted position, as indicated in Figure 2, and when no liquid is flowing in the line.

The longer section 72 of the valve, of this embodiment of my invention, is preferably bent inwardly of the casing 38, whereby the valve in its normal rest position is partially open to permit of an initial, though limited, flow movement of the fluid in the line upon initiating a discharge, such initial flow to be preferably just about sufficient to actuate the valve control mechanism.

By reason of the valve arrangement just described, it will be noted that the valve is not free to open immediately upon initiating a discharge, for the initial pressure surge against the valve 64 is absorbed in overcoming the static inertia of the counterweight 54 acting through the link in a direction opposing the opening of such valve, and in attempting to force the piston forward against the liquid on the work side of the piston, the relief opening 44 being too small to afford relief during this initial surge. Following the initial surge of pressure, the piston becomes resistively responsive to the pressure then existing in the casing, by reason of the relief opening 44 which permits of a slow reduction of back pressure against the work surface of the piston. A slow forward movement of the piston will take place under these conditions until communication between the piston groove 48 and the cylinder groove 52 is established, when the back pressure against the face of the piston is suddenly and substantially entirely eliminated and the piston is freed from such restraint. The result is a sudden completion of the piston stroke. During the slow movement period of the piston, the valve opening past the gate 64 is substantially unaffected, for while the larger portion 72 of the gate is closing, the smaller section 68 is swinging open, with the net result of substantially no change in the opening through the valve.

The sudden and full release of the back pressure against the piston is timed to occur when the larger gate section 72 is substantially closing its portion of the fluid path through the valve so that a full and complete opening of the valve will take place in response to the sudden forward thrust of the piston to the end of its stroke. The holding up of the full capacity flow during the resistive responsive period of the piston, which may be varied to suit conditions by altering any of the factors determining the period, provides the time interval necessary to remove any accumulation of air from the liquid before sending it on through the meter.

Restoration of the piston to its normal rest position upon cessation of flow of fluid through the line, is assured through the action of the counterweight 54. Its return time may be materially shortened by the addition of a valve 74 in the piston head, operative to permit of a quicker interchange of fluid from the interior of the casing to the work side of the piston on the return stroke than would be permitted by the relief opening 44 itself. Such valve may take the form of a disc 76 at the work side of the piston and slidably secured to the piston head by a stem 78. A perforation 80 or two through the head and within the area covered by the disc 76 are thus adapted to be covered during the forward movement of the piston, and uncovered during the return movement.

The forward stroke of the piston may be determined by impact of the piston against the end of the cylinder 40. I prefer, however, to avoid such impact by terminating the stroke just short of the end of the cylinder. This I accomplish by providing an extension 82 at the gate end of the link against which the gate will abut as the gate reaches its maximum desired open position, the assembly being so designed that this will occur when the piston has reached the desired end of its stroke.

In the modified form of valve assembly disclosed in Figures 6, 7 and 8, the gate 84 is substantially planar and eccentrically pivoted, but in its closed position, which coincides in this embodiment with its normal rest position, sufficient clearance is provided to permit of an initial but considerably limited flow, upon start of discharge from the line. The rest position is fixed by a valve seat flange 85 extending inwardly on frame 66.

The valve control mechanism 86 includes a cylinder 88 terminating in a threaded plug 90 whereby it is affixed to the wall of the casing 38. The cylinder is formed with an integral angularly-disposed offset 92 adjacent the casing wall in which the cylinder is mounted. The offset has a bore 94 longitudinally therethrough communicating with the interior of the cylinder adjacent the casing wall and, by means of a hole 96 through the plug, such communication is extended into the casing. The offset bore is closed at its outer end by a screw closure 98 threaded therein, and is intersected at an intermediate point by a longitudinal passage 100 provided within the wall of the cylinder. This longitudinal passage communicates with the interior of the cylinder at longitudinally spaced points through a pair of perforations 102 and 104, respectively, the first at substantially the halfway point and the other adjacent the end of the cylinder. The construction of the cylinder may be facilitated by forming it open ended and capping the open end with a plate 106 bolted thereon.

The piston may be of the cupped leather type, that is, formed by a leather cup seal 108 held between rigid discs 110 and 112, respectively, and mounted at the end of a piston rod 114. The piston rod extends through the center of the plug 90, and into the casing. At its inner end, is mounted a two prong fork or guide 116 which extends toward the gate 84 and straddles a pivot pin 118 carried between a pair of ears 120 on the smaller section of the gate. A compression spring 122 surrounding the piston rod exerts continuous pressure against the fork 116, thereby tending at all times to hold the piston in retracted position and the gate in its normal closed position as illustrated in Figure 7.

In the set-up just described, the bore opening 94 through the angular offset 92 functions in the same capacity as the relief opening 44 in the first embodiment described, since it maintains restricted communication between the work side of the piston and the interior of the casing during movement of the piston from its normal rest position to the opening 102. Such bore opening may be a fixed unobstructed opening of limited size, but I prefer to make it over-size and adjust its effective size by an adjusting screw 124 threadedly received in the bore. This allows of substantial leeway in manufacturing tolerances, as the adjustment permits regulation of the rate of travel of the piston during the initial portion of its forward stroke whereby the duration of the hold-back period may be controlled.

After passing the opening at the halfway mark, this opening 102 then provides enlarged fluid passage between the work side of the piston and the interior of the casing, and the resistance previously encountered against the work surface of the piston is essentially eliminated, thus permitting a sudden and increased velocity of travel of the piston for the remainder of its stroke.

The forward movement of the piston is against the action of the spring 122. Consequently, like the counterweight 54 of the previous embodiment, this spring will restore the piston and gate to their normal rest positions, upon cessation of flow of liquid through the line to the meter, the length of piston rod 114 being preferably such that the piston 108 does not strike the end of cylinder 88 in approaching its rest position.

It is noted in connection with this second embodiment, that the turning moment on the gate during the initial or resistively responsive portion of the piston stroke is quite small. This adds somewhat to the load resistance of the piston and, consequently, has the effect of increasing the hold-back period. Of course, the length of such period may be increased or decreased to suit conditions, not only by the adjustment screw 124 but by utilizing a stiffer or weaker spring, as desired.

While I have described two embodiments of my invention, the same is susceptible to change and alteration, without departing from the spirit thereof, and I accordingly do not desire to limit my protection to the specific details of these embodiments, except as may be necessitated by the appended claims.

I claim:

1. In combination, a fluid meter, air-separation means associated with liquid flow to said meter to separate air from liquid during normal flow of such liquid to said meter, flow delay means extending only partially across the flow path to said meter at all times in the absence of flow therethrough to permit an initial reduced flow of liquid thereby to said meter, said flow delay means being activated by said initial reduced flow of liquid and including a slow release type valve assembly for precluding full flow during a time period sufficient to permit said air-separation means to free the initial portion of liquid of excessive amounts of air trapped therein.

2. In combination, a fluid meter, air-separation means associated with liquid flow to said meter to separate air from liquid during normal flow of such liquid to said meter, a normally partially open flow controlled valve assembly, said valve assembly being resistively responsive to the initial flow of liquid to said meter during a metering operation and including time delay means independent of liquid level for delaying full opening of the valve of said assembly, for maintaining a reduced initial flow of liquid through said meter over an initial time period to permit said air-separation means to free the initial portion of liquid of excessive amounts of air trapped therein.

3. In combination, a fluid meter having an inlet passage thereto for liquid to be metered, air-separation means in the path of flow of such liquid to said meter for removal of air from such liquid existing therein during continuous flow thereof to said meter, a gate in the inlet passage to said meter, and means independent of liquid level, resistively responsive to the initial flow of liquid through said meter and cooperating with said gate to retard the full opening of said gate for a period of time following the start of such liquid flow.

4. In combination, a fluid meter having an inlet passage thereto for liquid to be metered, air-separation means associated with the flow of such liquid to said meter for removal of air from such liquid existing therein during continuous flow thereof to said meter, a valve in the inlet passage to said meter normally only partially closing said passage to permit of an initial reduced flow of liquid thereby, means normally tending to hold said valve in said partially closing condition, and piston means resistively responsive to said initial flow of liquid to said meter for gradually overcoming the closing effect of said closing means and causing a delayed opening of said valve.

5. In combination, a fluid meter having an inlet passage thereto for liquid to be metered, air-separation means in the path of flow of such liquid to said meter for removal of air from such liquid existing therein during continuous flow thereof to said meter, a normally partially open valve in the inlet passage to said meter, valve control means independent of liquid level, resistively responsive to the initial flow of liquid to said meter and cooperative with said valve to retard the full opening of said valve for a period of time following the start of such liquid flow, and means for restoring said valve to its partially open condition upon cessation of liquid flow to said meter.

ALBERT J. GRANBERG.